United States Patent [19]
Hague et al.

[11] Patent Number: 5,132,784
[45] Date of Patent: Jul. 21, 1992

[54] COMB FILTER-BURST LOCKED CLOCK CIRCUITRY

[75] Inventors: John A. Hague; Todd J. Christopher, both of Indianapolis, Ind.

[73] Assignee: Thomson Consumer Electronics, Inc., Indianapolis, Ind.

[21] Appl. No.: 702,978

[22] Filed: May 20, 1991

[51] Int. Cl.$^5$ .................................... H04N 9/78
[52] U.S. Cl. ................................ 358/31; 358/19
[58] Field of Search ............... 358/31, 40, 37, 21 R, 358/13, 19

[56] References Cited
U.S. PATENT DOCUMENTS

| | | | |
|---|---|---|---|
| 4,543,600 | 9/1985 | Bolger | 358/13 C |
| 4,604,646 | 8/1986 | Karlock | 358/153 |
| 4,745,463 | 5/1988 | Lu | 358/13 C |
| 4,882,626 | 11/1989 | Fling et al. | 358/166 |
| 4,961,108 | 10/1990 | Perlman | 358/31 |

Primary Examiner—James J. Groody
Assistant Examiner—Kim Yen Vu
Attorney, Agent, or Firm—Joseph S. Tripoli; Eric P. Herrmann; Ronald H. Kurdyla

[57] ABSTRACT

The present invention is directed to a video signal processing system including a burst locked clock generator which is repsonsive to separated chrominance signal provided by a comb filter. The comb filer includes apparatus responsive to a burst gate signal, for passing non-comb filtered video signal during burst intervals thereby enhancing the response time of the clock generator.

6 Claims, 2 Drawing Sheets

COMB FILTER-BURST LOCKED CLOCK CIRCUITRY

This invention is related to video signal processing circuitry including comb filters followed by circuitry for generating burst locked clock signals.

BACKGROUND OF THE INVENTION

Video signal processing circuitry of the type used for processing, for example, composite video signal, typically include a burst locked clock signal generator for generating a reference or clock signal to aid in demodulation of the chrominance component of the composite signal, or in the case of digital signal processing apparatus, to provide a sampling and processing clock signal. The burst locked clock generator nominally is coupled to be responsive to the burst component of the composite signal, prior to the separation of the luminance and chrominance components. However it has been found to be advantageous, particularly in digital processing systems, to couple the burst locked clock generator at a point subsequent luminance and chrominance separation. In so doing the burst locked clock generator can be made responsive to a burst component which has been processed by automatic chrominance correction, ACC, and thereby provide a more accurately phased clock signal, particularly for received signals of low amplitude.

Currently the circuitry of choice for separating the luminance and chrominance components includes a comb filter. Separating the luminance and chrominance components via comb filtering involves summing signals from at least two horizontal lines of video signal. As a result the separated burst component is the sum or average of the burst signal from at least two lines. This averaging process tends to remove phase errors from the resultant burst component. This is particularly problematic in systems using adaptive comb filters wherein contributions to the resultant signal are derived from different lines at different times. Alternatively the comb filtering process may be viewed as low pass filtering the burst signal, and thereby slowing the response time of the burst locked clock generator.

SUMMARY OF THE INVENTION

The present invention is directed to overcoming the loss of phase information in a system including a burst locked clock generator which is responsive to separated chrominance signal provided by a comb filter. The comb filter includes apparatus responsive to a burst gate signal, for passing non-comb filtered video signal during burst intervals.

DETAILED DESCRIPTION

The invention will be described in a digital signal processing environment for processing NTSC signals. It should be appreciated however that it is equally applicable to analog signal processing circuitry and to video signals of other standards, in particular PAL.

Figure 1:
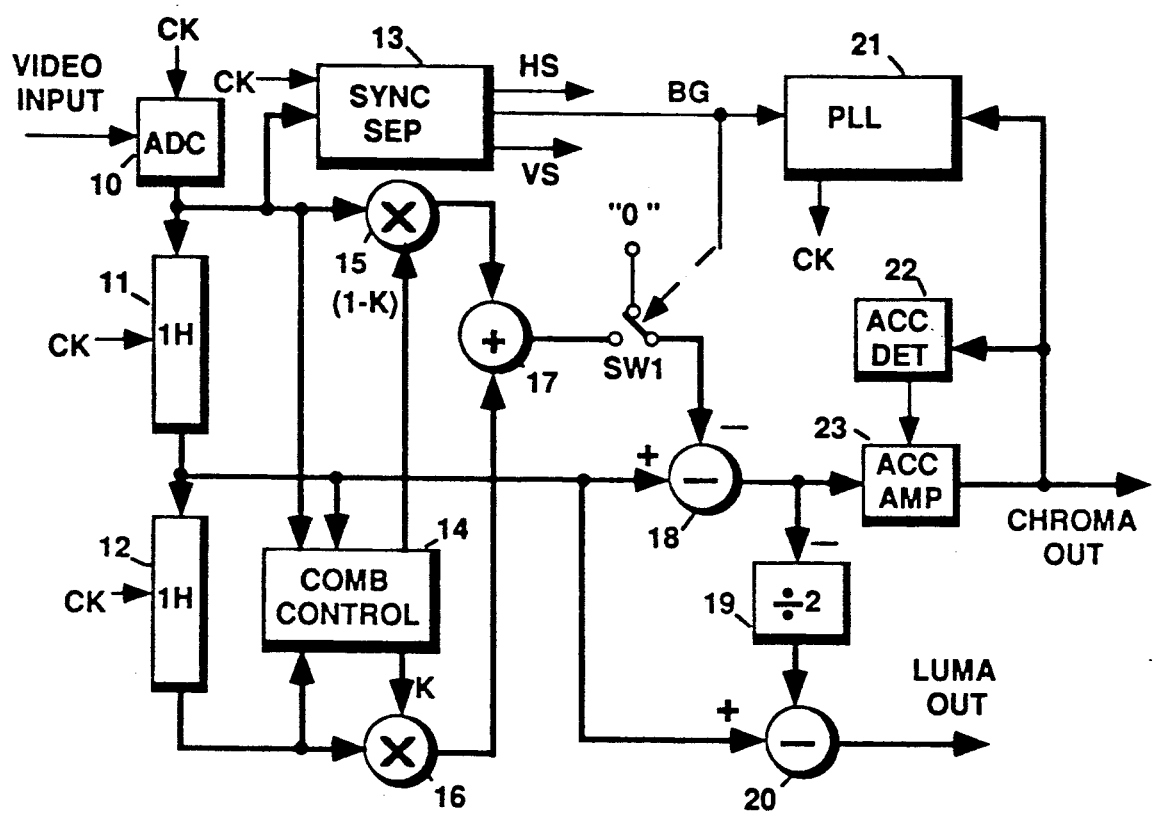
FIG. 1 is a block diagram of a portion of a video signal processing apparatus including a burst locked clock generator and an adaptive comb filter embodying the present invention.

Referring to FIG. 1, an analog video signal including at least burst, synchronizing, and chrominance components, from for example a television receiver tuner/IF circuit (not shown) is applied to an analog to digital converter, ADC 10. The ADC responsive to a clock signal CK, samples the analog video signal and provides pulse code modulated PCM samples representing the video signal. The PCM samples are coupled to a Sync Separator 13 which generates horizontal and vertical synchronizing signals from synchronization components of the received signal. In addition it provides a burst gate signal, BG, having gating pulses coincident with the burst component of the converted signal. The PCM samples are also coupled to the cascade connection of two delay lines 11 and 12, which respectively provide PCM samples delayed by one and two horizontal line periods. The PCM samples from the ADC and the delayed PCM samples from the delay lines 11 and 12 are coupled to a comb filter control circuit 14 which generates control signals K and (1-K). The control signals K and (1-K) are applied to attenuators 16 and 15 which respectively proportion the PCM samples provided by the delay line 12 and ADC 10. The proportioned samples are additively combined in an adder 17, and the combined samples are then coupled to the subtrahend input of a subtracter circuit 18. PCM samples from the delay line 11 are coupled to the minuend input of the subtracter circuit, the output of which corresponds to a comb filtered chrominance signal. Circuit elements 11-18 form a generally known adaptive comb filter circuit.

The samples provided by the subtracter circuit 18 are coupled to an ACC circuit 23 which applies gain/attenuation to the chrominance signal in an amount to condition the burst component to exhibit a predetermined amplitude. Samples from the ACC circuit are provided to further processing circuitry (not shown) e.g., saturation control and matrix circuitry, and to an ACC detector 22 and a phase locked loop 21. The ACC detector, responsive to the samples output from the ACC circuit during burst intervals, develops control signals for controlling the amount of gain/attenuation applied by the ACC 23.

The phase locked loop, PLL, includes a local oscillator and responsive to the burst gate pulses and the burst component of the chrominance signal provides a reference or clock signal CK phase locked to the burst signal, albeit nominally at a multiple of the burst frequency. The clock signal is distributed to the various processing elements in the circuitry.

In order to preclude applying a line averaged burst component to the PLL 21, the comb filter function is inhibited during the burst interval. This is accomplished in the exemplary circuitry of FIG. 1 by coupling the proportioned samples from the adder 17 to the subtracter 18 via a switch SW1. During the active video portion of each line interval, switch SW1 couples the adder 17 to the subtracter 18. During the burst interval of each line interval the switch SW1 couples a value of zero to the subtracter 18. Thus during the active and burst intervals, the subtracter 18 provides comb filtered chrominance and composite video respectively.

Figure 1A:
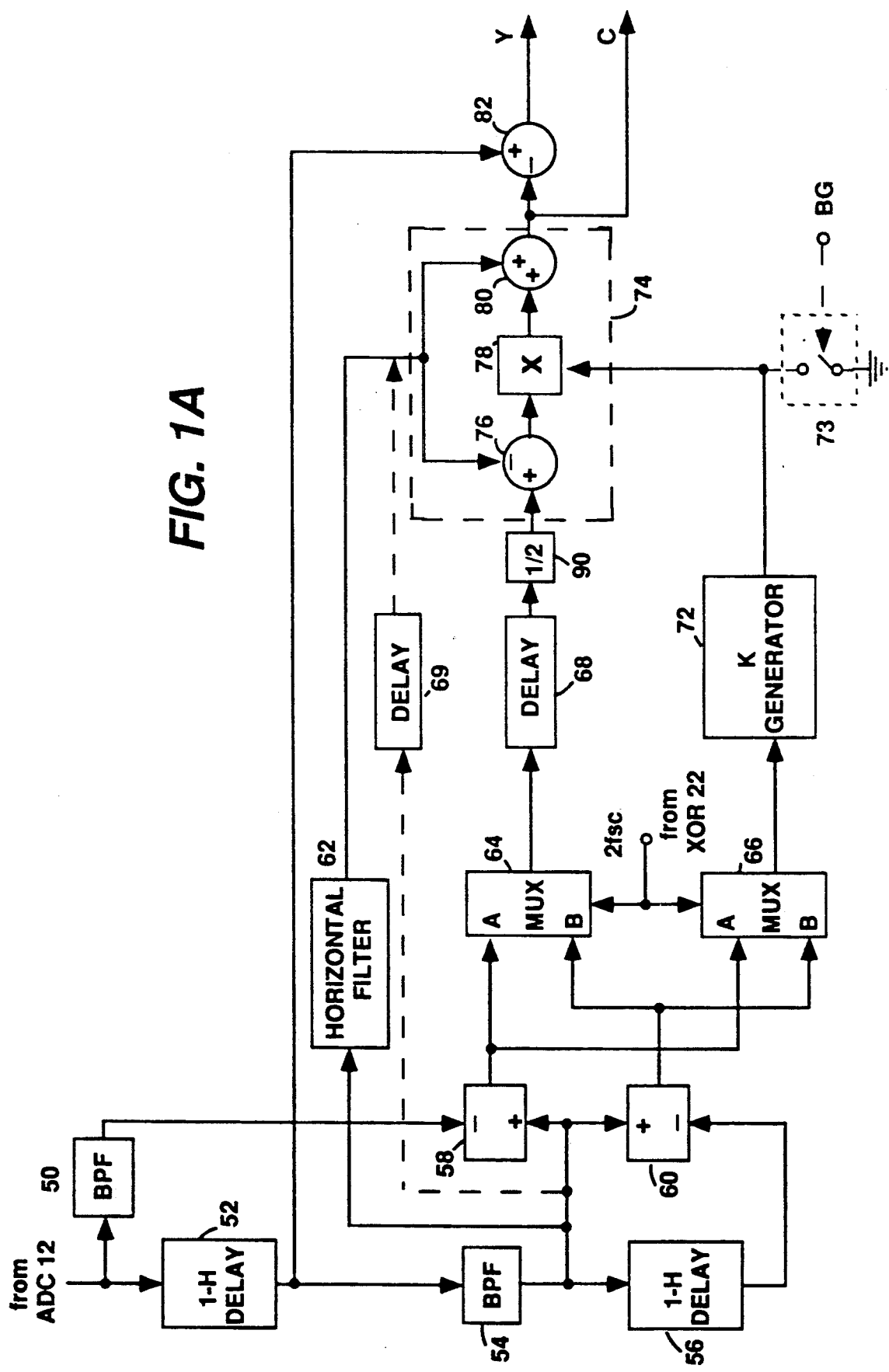
FIG. 1A is a block diagram of a PAL version of an adaptive comb filter including means to inhibit comb filtering during burst.

A PAL version of an adaptive comb filter is illustrated in FIG. 1A. This comb filter is described in U.S. Pat. No. 4,961,108 and will not be described herein (FIG. 1A and the numbering of the elements therein conform to the numbering used in FIG. 3 of the referenced patent). Suffice it to say that video signal samples from three horizontal lines are adaptively added in the element 74 controlled by a signal K. When K is equal to a zero value, non-comb filtered chrominance signal is applied to the chrominance output C (that is signal from delay element 62 via BPF 54 and filter 62). Therefore, if the chrominance signal at output C is subsequently applied to a PLL for clock generation, comb filtering may be inhibited in this apparatus during the burst intervals simply by forcing the value of K to zero during the burst intervals. This may be accomplished internal to the K generator 72 responsive to a burst gate signal or external to the K generator 72 by clamping the K control bus to ground as indicated by the switch 73 shown in phantom.

Figure 2:
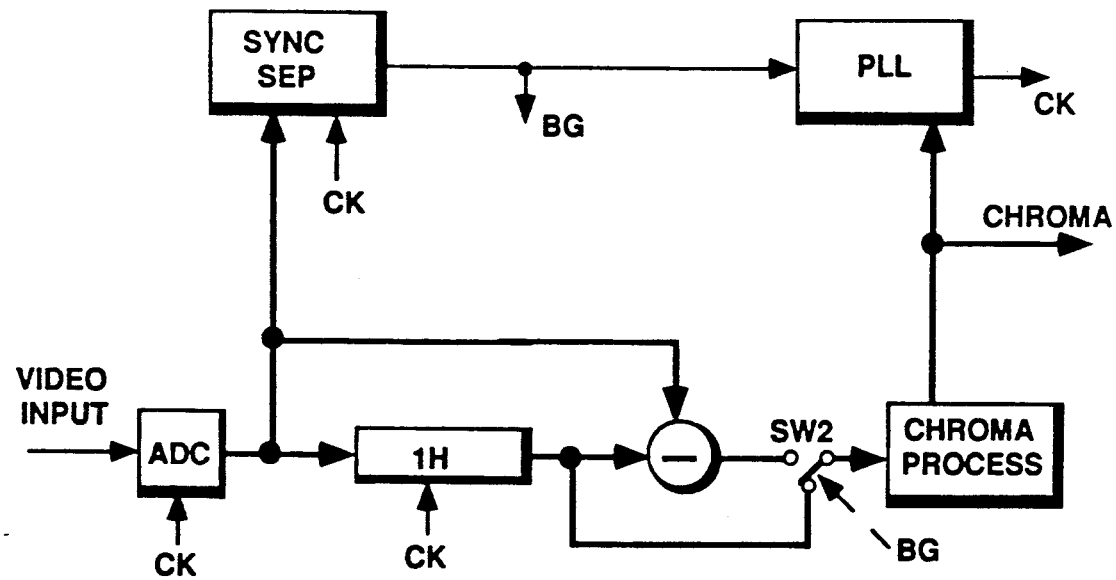
FIG. 2 is a block diagram of a portion of a video signal processing apparatus including a burst locked clock generator and a non adaptive comb filter embodying the present invention.

FIG. 2 shows a conventional 1-H comb filter for providing filtered chrominance signal including a PLL for generating a clock signal coupled to the output of the filter. In this circuit, comb filtering is inhibited during burst intervals by virtue of a switch SW2 which is conditioned by burst gate pulses to substitute non comb filtered video signal into the chrominance signal path.

What is claimed is:

1. Video signal processing apparatus for processing a video signal including a burst component, said apparatus including comb filter means responsive to said video signal for providing comb filtered signal at an output thereof; clock signal generating means coupled to the output of the comb filter means for generating a clock signal phase locked to said burst component; and means cooperating with said comb filter means during occurrences of said burst component for applying non-comb filtered burst component to the output of the comb filter means.

2. The apparatus set forth in claim 1 wherein said comb filter means is an adaptive comb filter including means for proportionally combining video signal from first and third horizontal lines with video signal from a second horizontal line, and said means cooperating with said comb filter includes means to inhibit the proportional combining during occurrences of the burst component such that said adaptive comb filter provides video signal from only said second horizontal line during occurrences of said burst component.

3. The apparatus set forth in claim 1 wherein said clock signal generating means is coupled to the output of said comb filter means by automatic chrominance control circuitry.

4. The apparatus set forth in claim 1 wherein said comb filter means includes means for combining video signals from at least two horizontal lines to provide a combined signal; and said means cooperating with said comb filter includes a switch means for coupling video signal from one of said at least two horizontal lines during occurrences of the burst component and coupling said combined signal to the output of said comb filter otherwise.

5. The apparatus set forth in claim 4 further including means responsive to said video signal for generating burst gate pulses occuring during the presence of said burst component, and wherein said switch means is responsive to said burst gate pulses 6. The apparatus set forth in claim 1 further including means responsive to said video signal for generating burst gate pulses occuring during the presence of said burst component, and wherein said means cooperating with said comb filter is responsive to said burst gate pulses for applying non-comb filtered burst component to the output of said comb filter means.

* * * * *